United States Patent [19]

Hofmann

[11] Patent Number: 4,772,132
[45] Date of Patent: Sep. 20, 1988

[54] SENSOR FOR FLUIDIC SYSTEMS
[75] Inventor: Manfred Hofmann, Altendiez, Fed. Rep. of Germany
[73] Assignee: Hydrotechnik GmbH, Fed. Rep. of Germany
[21] Appl. No.: 853,064
[22] Filed: Apr. 17, 1986
[30] Foreign Application Priority Data
Apr. 17, 1985 [DE] Fed. Rep. of Germany ....... 3513749
[51] Int. Cl.$^4$ ............................................. G01K 1/14
[52] U.S. Cl. ..................... 374/143; 374/148; 374/208
[58] Field of Search ............... 374/138, 143, 148, 147, 374/208; 73/708
[56] References Cited

U.S. PATENT DOCUMENTS

| 1,918,258 | 7/1933 | Fredricksen | 374/143 |
| 2,727,389 | 12/1955 | Rose et al. | 374/143 |
| 3,041,880 | 7/1962 | McCarvell et al. | 73/756 |
| 3,100,391 | 8/1963 | Mansfield | 374/143 |
| 3,255,631 | 6/1966 | Franks | 374/143 |
| 3,354,716 | 11/1967 | Wiebe et al. | 374/143 |
| 3,430,494 | 3/1969 | Dockery | 73/756 |
| 3,581,568 | 6/1971 | Pfefer | 374/148 |
| 3,857,282 | 12/1974 | Doorley et al. | 374/143 |
| 4,005,847 | 2/1977 | Ekman | 73/756 |
| 4,576,049 | 3/1986 | Kohnlechner | 374/143 |

Primary Examiner—William A. Cuchlinski, Jr.
Assistant Examiner—Thomas B. Will
Attorney, Agent, or Firm—Robert J. Koch

[57] ABSTRACT

A sensor for fluid systems for continuous detection of operating pressures and temperatures, with a sensor housing to receive a temperature probe and a pressure sensor. Simultaneous detection of pressures and temperatures is achieved by a sensor housing having a connecting nipple equipped with a bore. A temperature probe passes through the bore forming an annular flow channel which is fluidically connected to a pressure sensor chamber of a pressure sensor. The temperature probe is adjustable in an axial direction by an adjusting device.

12 Claims, 1 Drawing Sheet

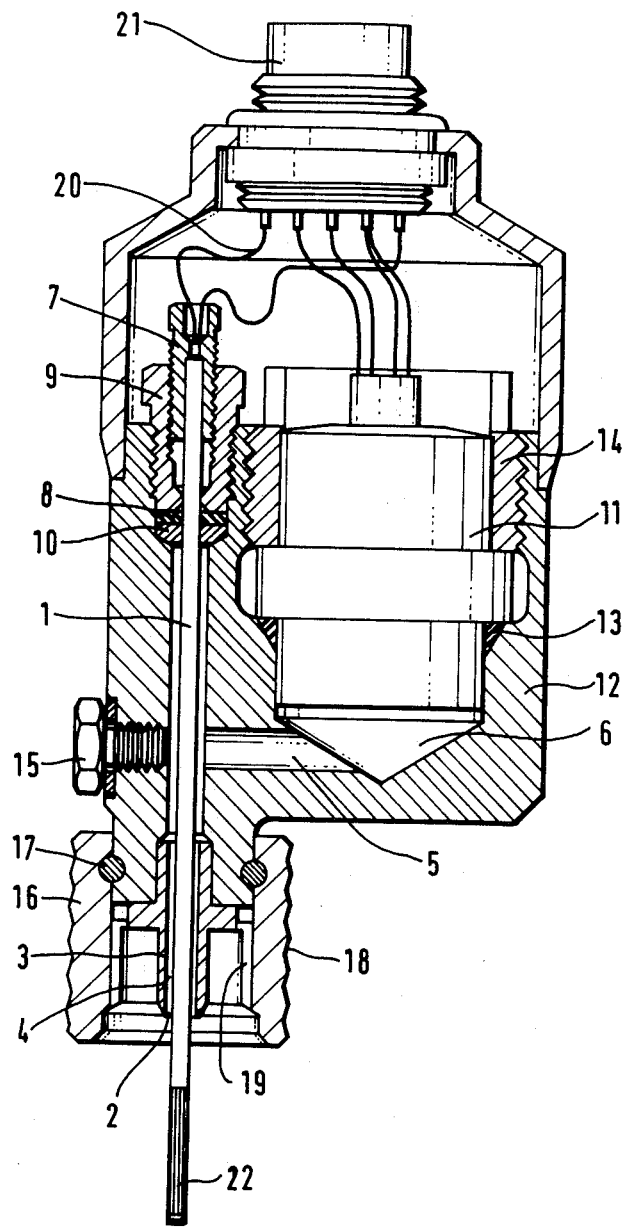

SENSOR FOR FLUIDIC SYSTEMS

BACKGROUND OF THE INVENTION

1. Field of the Invention

The invention relates to a fluidic system sensor for continuous and simultaneous detection of operating pressures and temperatures, more particularly a sensor housing containing temperature probe, a pressure sensor and bores and passages to the sensors in the sensor housing.

2. Description of the Related Art

Known measuring couplings for fluid systems consist of a coupling bushing under line pressure in the installed state for detection of working pressures and temperatures of fluid media. Spring-loaded and mechanically actuated check valves are located in the bores of these couplings.

This type of measuring coupling is used to provide testing or measuring connections on pressure lines. The coupling bushing is usually fixedly installed with screw threadings in the pressure line of a fluid system. A sealing nipple in the form of a hollow stud is screwed onto said coupling bushing fixedly connected to a hose by a union nut for the duration of the testing or measuring activities. The couplings may be connected under pressure, i.e., without shutting down the installation, by measuring lines to corresponding measuring instruments. Flexible measuring lines may be installed in a manner similar to electric cables, so that expensive laying of pipelines is avoided, for connection of fixedly installed instruments such as manometers, selective manometer switches, electric pressure transducers and manometric switches. The effective operating pressures in fluid lines may be measured directly by such measuring coupling without release of venting screws and screwed pipe connections. Couplings of this type are used in highly different structural elements and controls of fluid systems. A protective cap, equipped with external threading, is screwed onto the coupling bushing following disconnection of the coupling to prevent penetration of dirt into the bushing and for additional sealing in case the check valve is not tightly installed in the coupling bushing.

Temperatures of fluid media have been measured heretofore by temperature sensors fixedly installed in the fluid flow or installed in hermetically sealed immersion tubes.

In installations with immersion tubes, in numerous cases, the temperature of the housing or an intermediate value different from the medium temperature rather than the desired medium temperature is erroneously measured due to the lack of knowledge of the requirements of the measuring technique.

U.S. Pat. No. 4,096,754 describes a measuring coupling for fluidic systems for detection of operating pressures and temperatures, where the measuring probe extends through a mechanically actuable ball valve in the operating state. The valve must be closed immediately following the passage of the probe upon removal of the probe from the measuring coupling. Operating errors cannot be excluded due to forced setting of the position of the valve. The measuring coupling cannot be used in difficultly accessible locations because removal of the probe is cumbersome both mechanically and with respect to handling; considerable space is required in view of the rotating valve needed.

A further device for the measurement of high pressures and temperatures in a hydraulic or pneumatic system is shown in DE No. 26 30 640. The device is equipped with a piezo-resistive pressure gauge and an electric circuit and integrated in a housing into a single structural unit. A pressure gauge is located in an oil filled transmission membrane housing, with contact pins embedded in molded glass guides of the transmission membrane housing distributed over the circumference.

The pressure gauge unit is cemented onto a small base disk having a diameter larger than the unit. Passages distributed over the circumference are provided for thorough guidance of the contact pins, said passages corresponding to those of the transmission membrane housing. The contact pins lead from the electric contacts of the sensor out of the pressure gauge to the electronic means located outside the system which serves to supply the sensor system and amplify the signals generated. A compact measuring system connectable by a simple screw and measuring adapters to a pressurized hydraulic or pneumatic system cannot be constructed in this fashion.

To perform exact measurements in all areas it is necessary to provided adjusting devices, in particular for measurement of high pressures and pressures under extreme conditions such as, for example, at high temperatures. It is necessary to measure and evaluate the physical conditions prevailing in the immediate vicinity of the pressure sensor and affecting the measuring accuracy of the sensor in order to adjust the pressure sensor and to maintain the adjustment continuously through the measurements. Similar considerations are valid for temperature measurements.

DE-OS No. 30 00 110 describes a probe for temperature and pressure measurements, intended in particular for geothermic exploration applications. In this embodiment each probe has separate bores and passages through the sensor housing, so that measuring points are at different locations. The temperature sensors are located in the housing equipped with bores, therefore the fluids to be measured must flow through the bores into the housing. Such a probe is not suitable for accurate measurements of short term temperature fluctuations in fluid systems, as the probe significantly affects the system so that no genuine values are measured.

A further disadvantage of this layout is that in systems under pressure it is not feasible to connect the screw and measuring adapters to a bore to open the screw and measuring adapter as no connecting nipple is provided.

SUMMARY OF THE INVENTION

It is an object of the present invention to provide a sensor that can be connected to pipelines or connecting points under pressure, whereby it is possible to measure simultaneously and continuously both the pressures and the temperatures including short term temperature fluctuations of the fluid media in the system without requiring on-line replacement of a pressure instrument connection with a temperature sensor, as is required in known systems.

According to the invention, the object of simultaneous detection of pressures, temperatures and short term temperature fluctuation is reached by a sensor housing equipped with a connecting nipple. A temperature probe traverses a bore through said nipple and defines an annular channel which is in fluid communication with the pressure sensor chamber of a pressure sensor. It is possible, according to the invention, to continuously detect two physically different measured values of the fluid system in one measuring location and to convert them independently of each other into corresponding electric values by the arrangement of the two measuring systems in a single housing fluidly connected to the system. The temperature probe is adjustable in the axial direction by use of an adjusting device in order to be able to variably enter the fluid system such as a flow pipe.

In a special embodiment of the invention, the temperature probe is sealed by a rubber elastic gasket, clamped with a packing box against a support ring.

To obtain a compact configuration, the pressure sensor is advantageously arranged axially parallel to the temperature sensor and sealed against the housing with an O ring. This results in a small assembly so that installation is possible even in locations affording little space.

The pressure sensor chamber advantageously comprises a venting device with a venting screw, arranged at the outlet of a transverse bore, connected fluidically with the pressure sensor chamber of the pressure sensor. The possibility of venting the system of the pressure sensor and the temperature sensor eliminates a significant error source.

The sensor housing has a connecting fitting to receive the connecting nipple, with a retaining ring being provided on the outer circumference of the fitting to hold an union nut to facilitate easy dismantling of the sensor system.

It is advantageous to equip the union nut with knurling and a coupling thread.

In a further development of the invention the sensor housing has a connecting plug having an electric cable box or block inside the housing connected by measuring cables to the temperature and pressure sensor.

The temperature sensor is embedded in the area of the tip of the temperature probe in order to further improve the sensor. The locations of temperature measurements may be chosen relatively freely due to the axial diplaceability of the temperature sensor. Temperature measurements may be effected outside a boundary flow or a known vortex flow in the fluid.

It is possible to specifically determine these flow anomalies in relation to their temperatures, wherein the bore measuring the pressure is located in the effective range of the temperature sensor.

BRIEF DESCRIPTION OF THE DRAWING

The invention will become more apparent from the explanation below with reference to the FIGURE. The FIGURE shows a temperature and pressure sensor according to the invention.

DETAILED DESCRIPTION OF THE PREFERRED EMBODIMENT

Pressures and temperatures are simultaneously detected by a sensor comprising a sensor housing 12 connected to a connecting nipple 3 equipped with a bore 2. A temperature probe 1 passes through the bore 2 defining an annular flow channel 4, which is in fluid communication with a pressure sensor chamber 6 of a pressure sensor 11. The flow channel formed around the temperature probe 1 leads through a transverse bore 5 to the pressure sensor chamber 6.

The temperature probe 1 is equipped with adjusting means 7 and is designed so that it is axially displaceable.

It is further sealed with a rubber elastic gasket 8 and clamped by a packing box 9 against a support ring 10.

The pressure sensor 11 is arranged axially parallel to the temperature probe 1 and immediately adjacent to it. An O ring 13 seals the pressure sensor 11 against the sensor housing 12. The pressure sensor 11 is connected to the sensor housing 12 by a closure screw 14. The pressure sensor chamber 6 comprises a venting device with a venting screw 15, arranged at the outlet of transverse bore 5 and in fluid commuication with the pressure sensor chamber 6 for venting the pressure sensor 11.

The sensor housing 12 is equipped with a joining fitting to receive the connecting nipple 3. A retaining ring 17 is provided on the outer circumference of said fitting to hold a union nut 16.

The union nut 16 exhibits knurling 18 and coupling threads 19 to insure simple handling.

The sensor housing 12 is equipped with an electric supply connecting plug 21, said plug comprising an electric cable block inside the housing connected to the temperature sensor 22 and the pressure sensor 11 by measuring cables 20.

In the embodiment shown, the temperature sensor 22 is embedded in the tip of the temperature probe 1, so that the fluid to be measured is detected directly and immediately.

Pressures and temperatures may therefore be measured simultaneously and nearly at the same location, continuously within a fluid system, without the need for changes during the measurement.

I claim:

1. A sensor for detection of fluid system temperatures and pressures and which can be connected to pipelines or connecting points under pressure comprising:
    a sensor housing;
    an axially displaceable temperature probe installed in said housing;
    means for adjusting axial displacement of said temperature probe within said sensor housing;
    a pressure sensor chamber located within said housing;
    means for sensing pressure arranged within said pressure sensor chamber;
    a connecting nipple that can be connected to pipelines and connecting points under pressure, said nipple exhibiting a bore connected to said housing wherein said temperature probe extends through said bore thereby defining an annular flow channel;
    passage means for fluid connection of said annular flow channel to said pressure sensor chamber.

2. A sensor as in claim 1 further comprising means for supporting said temperature probe, means for sealing said temperature probe, and means for holding said temperature probe.

3. A sensor as in claim 2 wherein said means for sealing said temperature probe comprises a gasket, a support ring, and a packing box wherein said packing box is arranged to clamp said gasket against said support ring.

4. A sensor as in claim 1 wherein the pressure sensor and temperature probe are arranged in an axially parallel manner.

5. A sensor as in claim 4 further comprising means for sealing said pressure sensor against said sensor housing.

6. A sensor as in claim 5 wherein said means for sealing comprises a closure screw within said sensor housing.

7. A sensor as in claim 1 further comprising means for venting said pressure sensor chamber wherein said passage means is a tranverse bore and said means for venting exhibits a venting screw arranged at an outlet of said transverse bore.

8. A sensor as in claim 1 wherein said sensor housing further comprises a connecting fitting for receiving said connecting nipple.

9. A sensor as in claim 8, wherein said connecting fitting comprises an outer union nut.

10. A sensor as in claim 9 wherein said union nut further comprises external knurling and internal coupling threading.

11. A sensor as in claim 1 further comprising a connecting plug in said housing internally and electrically connected by measuring cables to said temperature sensor and said pressure sensor.

12. A sensor as in claim 1 further comprising a temperature sensor embedded in a tip of said temperature probe.

* * * * *